United States Patent
Mairs

(10) Patent No.: US 8,422,648 B2
(45) Date of Patent: Apr. 16, 2013

(54) PROVISION OF TEXT MESSAGING SERVICES

(75) Inventor: Chris Mairs, Enfield (GB)

(73) Assignee: Metaswitch Networks Ltd, Enfield (GB)

( * ) Notice: Subject to any disclaimer, the term of this patent is extended or adjusted under 35 U.S.C. 154(b) by 322 days.

(21) Appl. No.: 12/947,672

(22) Filed: Nov. 16, 2010

(65) Prior Publication Data

US 2011/0280382 A1 Nov. 17, 2011

(30) Foreign Application Priority Data

Dec. 8, 2009 (GB) .................................. 0921474.3

(51) Int. Cl.
*H04M 11/00* (2006.01)

(52) U.S. Cl.
USPC ......................................... 379/93.01; 725/68

(58) Field of Classification Search ............ 725/62, 725/106, 133, 141, 153, 87, 32, 68, 43, 40, 725/51, 115, 109, 117; 379/39.1, 88.17, 379/88.14, 90.01, 142.04, 211.02, 88.13, 379/39

See application file for complete search history.

(56) References Cited

U.S. PATENT DOCUMENTS

| 5,818,437 | A | 10/1998 | Grover et al. |
| 8,261,208 | B2 * | 9/2012 | Radom et al. .................. 715/816 |
| 8,364,201 | B1 * | 1/2013 | Fujisaki ..................... 455/556.1 |
| 2004/0250285 | A1 * | 12/2004 | Murphy et al. .................. 725/75 |
| 2005/0066365 | A1 | 3/2005 | Rambo |
| 2008/0260125 | A1 * | 10/2008 | Barnes et al. ............ 379/142.04 |
| 2010/0054436 | A1 * | 3/2010 | LaFreniere et al. ...... 379/102.03 |
| 2011/0129072 | A1 * | 6/2011 | Knapp et al. .................. 379/88.13 |
| 2012/0209916 | A1 * | 8/2012 | Azuma et al. .................. 709/204 |

FOREIGN PATENT DOCUMENTS

| WO | 0149032 | A1 | 7/2001 |
| WO | 03051024 | A1 | 6/2003 |
| WO | 2004056119 | A1 | 7/2004 |
| WO | 2005052719 | A1 | 6/2005 |
| WO | 2007113617 | A2 | 10/2007 |
| WO | 2008137158 | A1 | 11/2008 |

* cited by examiner

*Primary Examiner* — Maria El-Zoobi
(74) *Attorney, Agent, or Firm* — Baker & Hostetler LLP

(57) ABSTRACT

A method for providing text messaging services to subscribers in a telecommunications network is presented. Each of the subscribers has subscriber equipment that includes a telephone and television equipment. The method includes receiving first key stroke data corresponding to at least one text character associated with a text message, the first key stroke data having been input by the subscriber on a telephone, and providing first text prediction data, obtained from a lookup of the first key stroke data in a text prediction database, for display via the television equipment, the first text prediction data including predicted text for the text character in the text message being created.

20 Claims, 5 Drawing Sheets

PROVISION OF TEXT MESSAGING SERVICES

CROSS-REFERENCE TO RELATED APPLICATIONS

This application claims priority to foreign Patent Application GB 0921474.3, filed on Dec. 8, 2009, the disclosure of which is incorporated herein by reference in its entirety.

FIELD OF THE INVENTION

This invention relates to methods and apparatus for providing text messaging services to subscribers in a telecommunications network. In particular, but not exclusively, the invention relates to the provision of text message services via subscriber equipment including a telephone.

BACKGROUND OF THE INVENTION

Conventional text messaging systems typically involve creation of a text message on a mobile telephone having an alphanumeric keypad with a number of input keys and a display screen. A user wishing to send a text message will press appropriate input keys on the keypad in order to open up a window in which the text message can be created. The user enters text characters for the text message by pressing further keys on the keypad each having one or more associated letters of the alphabet and/or other text symbols. The entered text characters are displayed on the display screen of the mobile telephone for visual review by the user.

In multi-tap text entry systems, each input key has more than one associated text character or symbol, so a user must cycle through each of the available characters for a key by repeatedly pressing the key. For example, a single press of the '5' key may cause a 'j' to be displayed on the screen, whereas two presses of the '5' key may cause a 'k' to be displayed, and three presses of the '5' key may cause an 'l' to be displayed. If a user is familiar with the text characters associated with each key, the user can create a text message by pressing on the keypad without looking at the electronic equipment display, so multi-tap systems can be used with little visual feedback from the user. However, multi-tap systems potentially require several keystrokes to enter a single letter so can lead to longer text message creation times.

In predictive text entry systems, each input key also has more than one associated text character or symbol, but instead of multiple key presses being required to enter a single character or symbol, more commonly used words may be entered using a single key press by the user. Predictive text systems will tend to reduce the number of key presses required to enter a word, as long as the word is included in the predictive text dictionary being used by the mobile telephone. A user presses the keys associated with each letter of the word they wish to type and as long as the predictive text dictionary contains the word in question and the key presses allow disambiguation of the word from other words in the dictionary, the word will be displayed on the screen. As one example, the sequence of key presses '93272' may cause the word 'zebra' to be displayed on a screen. As another example, the sequence of key presses '2253' may cause the word 'able' to be displayed on a screen, although several other words are possible (including cake, calf, bald, bake, etc.), so a user may be prompted for further input in order to disambiguate between each of the possible words. Well known predictive text systems include T9, provided by NUANCE COMMUNICATIONS and ITAP provided by MOTOROLA.

The T9 text prediction system includes a reduced keyboard disambiguating computer. The keyboard has twelve keys, nine of them labeled with numerous letters and other symbols, and those nine plus one more are labeled each with one of the ten digits. Textual entry keystrokes are ambiguous. The user strikes a delimiting "select" key at the end of each word, delimiting a keystroke sequence which could match any of many words with the same number of letters. The keystroke sequence is processed with a complete dictionary, and words which match the sequence of keystrokes are presented to the user in order of decreasing frequency of use. The user selects the desired word. The letters are assigned to the keys in a non-sequential order which reduces chances of ambiguities. The same "select" key is pressed to select the desired word, and spacing between words and punctuation is automatically computed. For words which are not in the dictionary, two keystrokes are entered to specify each letter. The system simultaneously interprets all keystroke sequences as both one stroke per letter and as two strokes per letter. The user selects the desired interpretation. The system also presents to the user the number which is represented by the sequence of keystrokes for possible selection by the user.

An on-line predictive text dictionary for use with electronic equipment in the form of a cellular radio telephone is also known.

Text messaging services are not widely available for analogue telephones because such telephones do not have any visual display capability by which a user may review the contents of a text message they are creating. Further, text prediction functionality is not available with such analogue telephones because such telephones do not have sufficient suitable data processing or data storage capabilities.

It would therefore be desirable to provide text messaging services including text prediction functionality to users of analogue telephones.

SUMMARY OF THE INVENTION

In accordance with a first aspect of the present invention, there is provided a method for providing text messaging services to subscribers in a telecommunications network, each of said subscribers having subscriber equipment comprising a telephone and television equipment, said method comprising the steps of:
  receiving first key stroke data corresponding to at least one text character associated with a text message, said first key stroke data having been input by said subscriber on a telephone; and
  providing first text prediction data, obtained from lookup of said first key stroke data in a text prediction database, for display via said television equipment, said first text prediction data comprising predicted text for said at least one text character in said text message being created.

Hence, the invention allows subscribers to create text messages using subscriber equipment including a telephone and television equipment. A subscriber creates a text message by entering text characters using key strokes on their telephone and views the characters in the text message being created using television equipment. The time and effort involved on the part of the subscriber in creating the text message may be decreased by use of a text prediction entity which provides text predictions based on the input text characters for insertion into the text message being created.

The first key stroke data can represent a single text character or a string or sequence representing a number of text characters.

In arrangements of the invention, the first text prediction data comprises a plurality of text segment predictions for the first key stroke data, the method comprising the steps of receiving predicted text selection data from the telephone, the predicted text selection data corresponding to a subscriber selection of a text segment from the plurality of text segment predictions for insertion into the text message being created, and transmitting update data to the television equipment of the subscriber, whereby the subscriber may view an updated version of the text message being created comprising the selected text segment. Hence, a subscriber may review a number of text segment predictions (such as one or more words, phrase or symbols) corresponding to the text characters they have entered and select the most appropriate segment for insertion into the text message using suitable input on their telephone. The subscriber can then review the contents of the text message created thus far on the television equipment.

Note that the insertion of a text prediction segment into a text message may occur without a subscriber making a specific selection from a number of different text segment predictions. The subscriber may be happy for a single text segment which is displayed on the television equipment to be used in the text message, in which case, an automatic selection mechanism can be employed. One such automatic selection mechanism may include the subscriber just pressing a key associated with the 'space' character or suchlike and continuing to type in characters for the next word they wish to include into the text message.

In alternative embodiments of the invention, the subscriber equipment may comprise a remote control and predicted text selection data may be received via a short-range air interface of the remote control.

According to embodiments of the invention, the method comprises the steps of receiving second key stroke data corresponding to at least one further text character associated with the text message, said second key stroke data being input by the subscriber on the telephone, and providing second text prediction data, obtained from lookup of the first key stroke data and the second key stroke data in the text prediction database, for display via said television equipment, said second text prediction data comprising predicted text for the at least one text character and the least one further text character in the text message being created. Hence, text predictions for a text message being created by a subscriber may be updated and viewed on the television equipment as the subscriber enters more key strokes for text characters in a word or words they wish to use in the text message. Updated text predictions may advantageously contain less word options for a subscriber to read through and select from.

The second key stroke data can represent a single text character or a string or sequence representing a number of text characters. In some embodiments of the invention, the television equipment comprises a set-top box connected to a television of the subscriber, wherein the text prediction data is provided by a network-based text prediction entity, the method comprising the step of transmitting text prediction data to the set-top box, whereby predicted text is displayed on the television. In other embodiments of the invention, the television equipment comprises a set-top box connected to a television of the subscriber, wherein the text prediction data is provided by the set-top box. Hence, either network-based or television equipment-based text prediction resources may be employed, depending on availability of such resources to the subscriber.

In embodiments of the invention, the method comprising the steps of maintaining a store of subscriber equipment identifiers for subscribers having access to the text messaging services in the network, the identifiers comprising for each subscriber, a telephony identifier associated with the telephone of the subscriber, and a television equipment identifier associated with the television equipment of the subscriber, prior to receipt of the first key stroke data, receiving a first subscriber equipment identifier associated with one of the telephone and the television equipment of the subscriber, in response to receipt of the first subscriber equipment identifier, determining from the store a second subscriber identifier associated with the other of the telephone and the television equipment of the subscriber, and contacting the other of the telephone and the television equipment using the second subscriber identifier of the subscriber whereby to initiate text messaging services for the subscriber in the network. Hence, identifiers for the subscriber equipment associated with subscribers can be used to ascertain which subscribers should be granted access to the text messaging services of the invention.

If a received identifier for one piece of subscriber equipment associated with a subscriber is present in the store, then text messaging services for the subscriber should be initiated. To initiate text messaging services for the subscriber, a correlation between identifiers for the subscriber's telephone and television equipment can be identified. To achieve this, the store is searched for an identifier stored in association with the received identifier, for example in a data record containing such data for the subscriber, and which therefore can be used to identify the other subscriber equipment for the subscriber which is to be used in the text message creation process. Text messaging services can then be initiated for the subscriber by contacting the other piece of subscriber equipment for the subscriber such that at least the two pieces of subscriber equipment which are to be involved in text messaging services for the subscriber are known.

In some arrangements of the invention, the first subscriber telephony equipment identifier comprises a subscriber equipment identifier associated with the telephone of said subscriber, for example the first subscriber telephony equipment identifier may comprise a telephone dialing number associated with the telephone of the subscriber. Hence, text messaging services may be initiated in response to subscriber input on their telephone. The contacting step can comprise transmittal of a text messaging services initiation message to a subscriber equipment set-top box, in response to receipt of which the set-top box can update the output of the television equipment accordingly in order to indicate to the subscriber that they may begin to enter text characters for the text message they are creating using key presses on the keypad on their telephone.

In other arrangements of the invention, the first subscriber equipment identifier comprises a subscriber equipment identifier associated with the television equipment of the subscriber, for example a network address associated with a set-top box. The contacting step may comprise activating a distinctive ring service (for example a short ring sometime referred to as a 'ringsplash') to the telephone of the subscriber. Hence, text messaging services may be initiated in response to subscriber input associated with their set-top box and visual display output device. When a subscriber hears the distinctive ring emanating from their telephone, the subscriber may take their telephone off-hook and begin to enter text characters for the text message they are creating using key presses on their telephone. The network address may comprise an Internet Protocol (IP) or Media Access Control (MAC) address for the set-top box or television equipment.

In embodiments of the invention, the text prediction database comprises a subscriber-specific text prediction dictionary for the subscriber, and the method comprises the steps of identifying the subscriber-specific text prediction dictionary for the subscriber in the text prediction database on the basis of the received first subscriber equipment identifier, wherein lookup of the first and/or second key stroke data for the subscriber in the database comprises lookup based on the subscriber-specific text prediction dictionary. Hence, a subscriber-specific text prediction dictionary for the subscriber who is requesting text messaging services can be identified by an identifier received from the subscriber equipment when text messaging services are initiated. This allows subscribers to use text prediction functionality which has been customized to their own preferences or common word use patterns. A subscriber-specific text prediction dictionary may be customized by the subscribers themselves by adding text entries manually to their dictionary, or automatically on behalf of the subscribers using one or more predetermined algorithms for detecting common word usage or suchlike by each subscriber.

The ordering of text predictions for display on visual display output device 104 may be carried out according to ranking based on prior use of the predictions by a subscriber, e.g. most frequently selected displayed first on-screen. Subscribers may also define their own algorithms for customizing their text prediction dictionaries.

According to one arrangement of the invention, the telephone comprises an analogue telephone having no capability to display the text message. Hence, the invention allows provision of text messaging services to subscribers who do not have a mobile telephone or similar devices with in-built text input and visual display capabilities.

According to other arrangements of the invention, the first and/or second key stroke data comprise dual-tone multi-frequency (DTMF) data created by the analogue telephone in response to key-presses by the subscriber on the analogue telephone during creation of the text message. Hence, a subscriber may use the keys on their analogue telephone to enter in text characters for the text message they are creating, which are then encoded as DTMF audible signals and transmitted into the network.

Embodiments of the invention comprise the steps of receiving from the subscriber equipment send created text message command data, and in response to receipt of the send created text message command data, transmitting created text message data to a short message service centre (SMSC) entity located in the telecommunications network, whereby the created text message is delivered to its intended recipient. Hence, when a subscriber has finished creating their text message, they can input a suitable command on their subscriber equipment indicating that the text message should now be sent. The command triggers the text message to be forwarded on to a suitable text messaging delivery entity in the network which is capable of delivering and/or managing delivery of the text message to the desired recipient.

Embodiments of the invention comprise displaying, via the television equipment, one or more contact identifiers associated with subscriber contacts, the contact identifiers having been retrieved from a network-based contact store associated with the subscriber in response to receipt of said send created text message data, receiving, from the subscriber equipment, contact selection data whereby one or more intended recipients for the created text message are identified to the short message service centre entity. Hence, one or more recipients for the text message can be selected by the subscriber from a number of contacts stored in a network-based address book.

In some embodiments of the invention, the send created text message command data is created by the telephone. Hence, a user may choose to send the text message they have created by a suitable key press on their telephone.

In other embodiments of the invention, the television equipment further comprises a remote control device having a short-range air interface, and the send created text message command data is created by the remote control device. Hence, a user may choose to send the text message they have created by a suitable key press on a remote control device which interfaces with either or both of the television and/or a set-top box connected to the television.

In embodiments of the invention where the television equipment includes a remote control device, predicted text selection data can be received from the subscriber's remote control device instead of the subscriber's telephone in order to select a text segment prediction for insertion into the text message being created by the subscriber.

In accordance with a second aspect of the present invention, there is provided apparatus adapted to perform the method of the first aspect of the invention.

In accordance with a third aspect of the present invention, there is provided a computer program product comprising a computer-readable medium having computer readable instructions recorded thereon, the computer readable instructions being operative, when performed by a computerized device, to cause the computerized device to perform the method of the first aspect of the invention.

BRIEF DESCRIPTION OF THE DRAWINGS

Further features and advantages of the invention will become apparent from the following description of preferred embodiments of the invention, given by way of example only, which is made with reference to the accompanying drawings.

DETAILED DESCRIPTION

Figure 1:
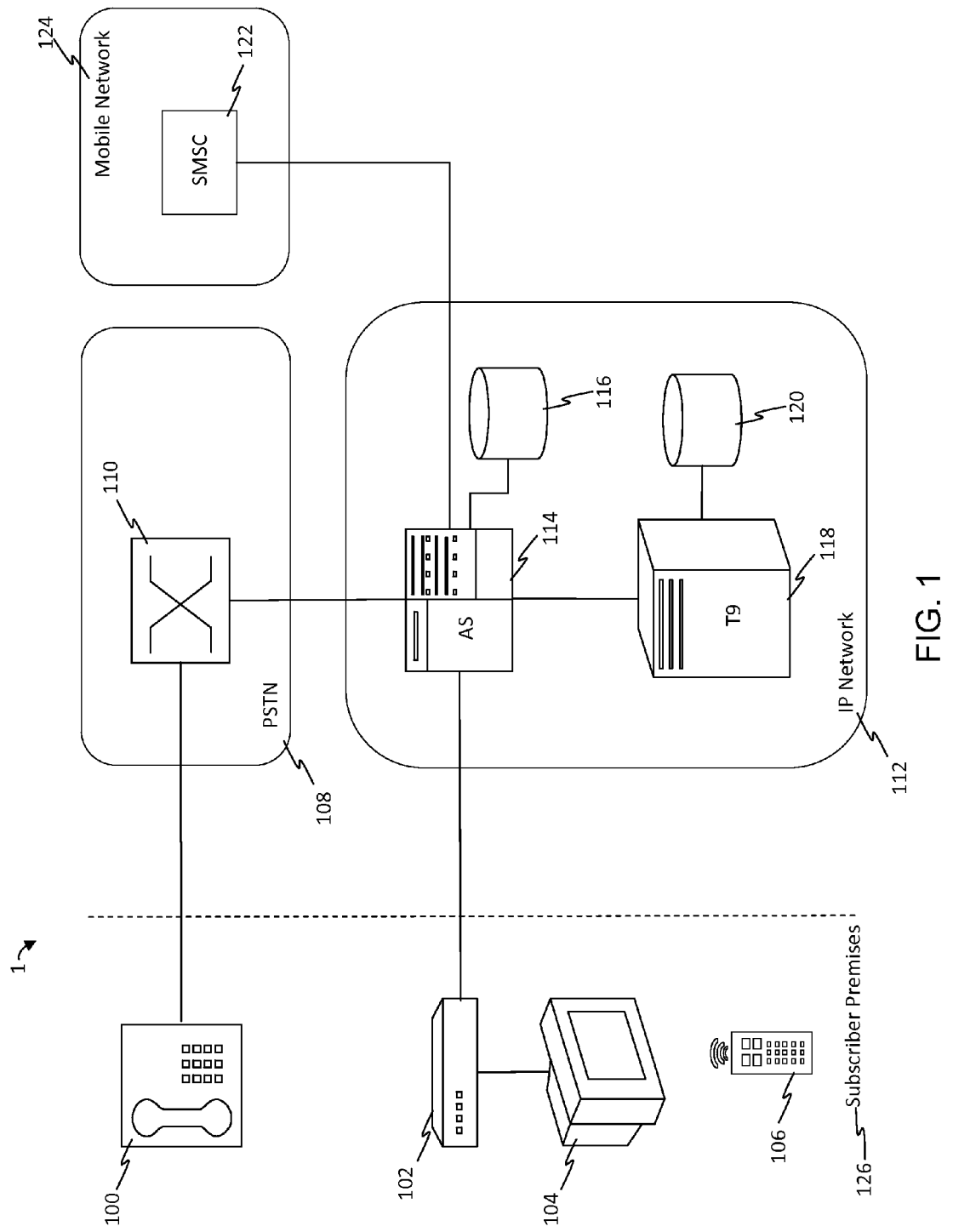
FIG. 1 shows a system diagram according to embodiments of the present invention.

FIG. 1 shows a system diagram according to embodiments of the present invention. FIG. 1 shows a telecommunications network 1 including a Public Switched Telephone Network (PSTN) 108, an IP network 112 and a mobile network 124.

In embodiments of the invention, text messaging services for subscribers are controlled by an application server 114 located in IP network 112 where data is primarily transferred using an Internet Protocol (also called an IP domain). IP network 112 interfaces with PSTN 108 and also mobile network 124 (also called a cellular communications network) in telecommunications network 1. Mobile network 124 may also interface directly (not shown) with PSTN 108.

The interfaces between PSTN 108, IP network 112, and mobile network 124 may include one or more gateway or session border controller entities (not shown) which carry out conversion between the various protocols and data formats used to transfer media data and signaling data in the different networks making up the telecommunications system. A media gateway (not shown) converts between the different protocols of media data passing between PSTN 108, IP network 112 and mobile network 124 such as packetized Voice over Internet Protocol (VoIP) data into Time-Division-Multiplexing (TDM) voice data and vice versa. A signaling gateway (not shown) converts between the different protocols of signaling information passing between PSTN 108, IP network 112 and mobile network 124 such as Session Initiation Protocol (SIP), Signaling System 7 (SS7), Integrated Services Digital Network User Part (ISUP), American National Standards Institute (ANSI)—41, Mobile Application Part (MAP) formats, etc.

Application server 114 (denoted 'AS' in Figures) may comprise a media gateway controller, service platform, call agent or softswitch and may perform other functions typically associated with such entities. One or more media and/or signaling gateways interfacing between PSTN 108, IP network 112, and mobile network 124 may be controlled by application server 114, or their function may be combined into application server 114 itself.

In embodiments of the invention, as well as providing the architecture for enabling conversion between both media data and signaling protocols via one or more media gateways and signaling gateways, application server 114 may also provide call processing intelligence for use in the selection of processes that can be applied to a telephone call, routing for a call within a network based on signaling and subscriber database information, the ability to transfer control of a call to another network element and management functions such as provisioning, fault detection and billing. For ease of explanation, it is hereafter assumed that application server 114 is one network entity, although in practice it may comprise a distributed set of entities.

IP network 112 also includes a subscriber data store 116 for storing data associated with subscribers such as contact details, subscriber profile data, and subscriber equipment identifiers. Data store 116 is accessible by application server 114 and may be located remotely or integral to application server 114. IP network 112 further includes a text prediction entity 118 (denoted T9 in Figures), and a text prediction database 120.

Subscriber data store 116 is used to store subscriber data associated with subscribers to the text messaging services of the present invention. When a subscriber registers for text messaging services according to the invention, they provide contact details and profile data, such as subscription level, billing tariff etc., which are added to store 116. The subscriber may also provide a subscriber equipment identifier for their telephone 100, for example the telephone dialing number of telephone 100. The subscriber may also provide a subscriber equipment identifier associated with their television 104, for example an Internet Protocol (IP) or MAC address for the set-top box 102 connected to television 104. The subscriber data, including subscriber equipment identifiers for a subscriber will be stored in association in store 116, for example in a database record entry specific to that subscriber.

The subscriber data can be added to data store 116 online by the subscriber via a web interface or suchlike, or manually by a service assistant operator employed by the text messaging services provider in response to the subscriber data being provided by the subscriber in paper format by post or verbally during a telephone call. In some scenarios, the service provider may already have access to the subscriber data from previously obtained subscriber records.

In embodiments of the invention, text prediction entity 118 is a network-based text prediction entity located in IP network 112 which is capable of providing text prediction services in response to text prediction requests received from other entities located in IP network 112 or elsewhere in telecommunications network 1. Text prediction entity 118 has access to a text prediction database 120 containing possible text prediction outputs for a wide range of possible text prediction request inputs. When text prediction entity 118 is provided with a text prediction input, i.e. one or more input text characters, it will perform a lookup for those one or more text characters in text prediction database 120. The lookup includes searching text prediction database 120 for one or more possible text predictions which correspond to the input text characters, resulting in the outputting of the one or more possible text predictions. Text prediction database could be monolingual, or multilingual, the language of the lookup and output being dependent on a subscriber preference stored in data store 116, and/or selectable from a settings menu (for example displayed on the screen of television 104) by the subscriber prior to text message composition.

The input text characters could include any combination of alphanumeric characters such as letters of the alphabet, numbers, punctuation and other symbols which a subscriber may wish to use in a text message.

Text prediction database 120 may include one or more subscriber-specific text prediction dictionaries. When a subscribe initially uses the text messaging services of the invention, a common default dictionary would typically be used, but over time and usage of the text messaging services of the invention, a customized text prediction dictionary for a subscriber can be built up, either by manual insertion of preferred words or phrases from the subscriber or by automatic customization in view of computer analysis of common word usage by the subscriber.

Text prediction entity 118 is denoted 'T9' in the figures, so could comprise a T9 text prediction system or suchlike provided by NUANCE COMMUNICATIONS. However, text prediction entity 118 could equally comprise any other predictive text system known in the art, such as MOTOROLA's ITAP system or EATONI ERGONOMICS' LETTERWISE system.

PSTN 108 includes a telephone switch 110 (often referred to as a Class 5 switch or central office) which provides telephony services to/from, i.e. serves, telephone 100. Telephone switch 110 may be a packet-based switch such as a softswitch, provided with an IP interface, or may be a circuit-based switch with a legacy interface such as Advanced Intelligent Network (AIN) or Parlay interface.

PSTN 108 also allows for provision of telephony services to a number of other subscriber telephones, either via telephone switch 110 or other switches, although in this particular example, only a single user device (telephone 100) is depicted.

Mobile network 124 includes a Short Message Service Centre 122 (SMSC) having text messaging processing, management and delivery capabilities. Mobile network 124 also includes other entities involved in mobile telephony call processing whose operation is well known in the art of mobile telephony and will not be described here in any detail.

FIG. 1 also shows a subscriber premises 126, such as a subscriber home or office, (indicated by items to the left-hand side of the dotted line in FIG. 1). Subscriber premises 126 has subscriber equipment including a telephone 100, and television equipment including a set-top box 102 (STB), a television 104 and a television remote control device 106.

Telephone 100 is a telephony device which does not have visual display capabilities such as an analogue telephone (also referred to as a plain old telephone service (POTS) telephone or black telephone) and will typically be a nonmobile, wireline telephone, but could also be a portable telephone with a short-range air interface to a wireline telephony connection.

STB 102 connects to the television 104 and receives a broadcast audio/video/data signal either via a cable or aerial (not shown). STB 102 is responsible for receiving the audio/video/data signal, carrying out any necessary data format conversion and sending the appropriate audio/video/data signal to the television 104. STB 102 has data processing capabilities for running application software in relation to subscriber services such as audio, interactive or Internet Protocol Television (IPTV) services.

Television 104 has audio and video output display capabilities and will typically comprise a television display screen, but could also comprise a computer monitor or image projector.

Remote control device 106 has a short-range air interface such as an infra-red or radio-frequency interface which can transmit control signals to STB 102 and/or television 104.

Figure 2:
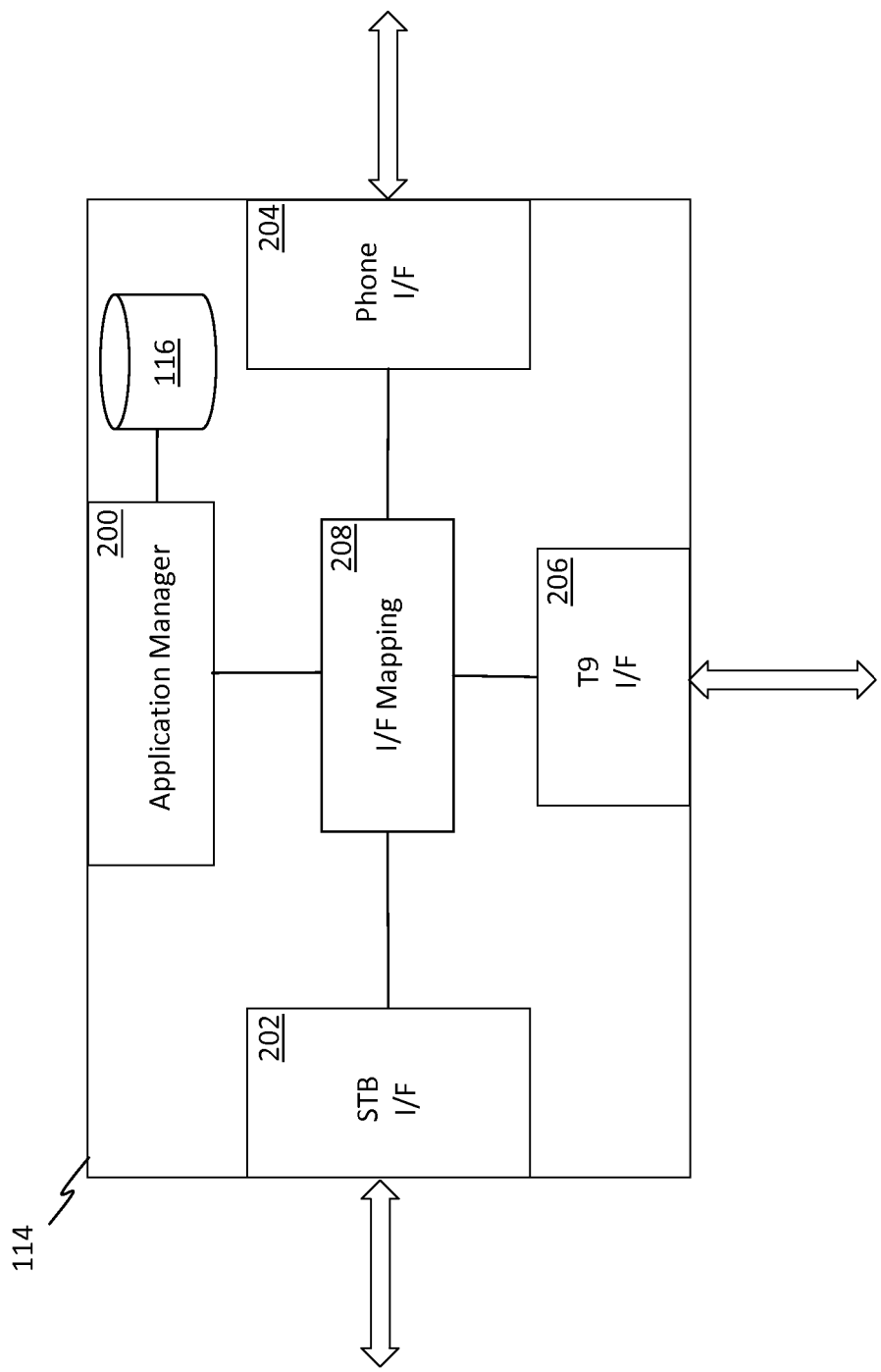
FIG. 2 is a block diagram showing functional elements of an application server according to embodiments of the present invention.

FIG. 2 is a block diagram showing functional elements of an application server according to embodiments of the present invention. Application server 114 performs the main data processing, control and management functions required to implement the subscriber text messaging services of the present invention. Application server 114 has a first interface 202 for transceiving data (both media and/or signaling data) to/from STB 102. Application server has a second interface 204 for transceiving data (both media and/or signaling data) to/from telephone 100 via telephone switch 110. If telephone switch 110 is a packet-based switch, second interface 204 will typically be an IP interface, whereas if telephone switch 110 is a circuit-based switch, second interface 204 will typically be a legacy interface such as AIN or Parlay interface. Application server has a third interface 206 for transceiving data (both media and/or signaling data) to/from text prediction entity 118. Application server 114 may have other interfaces (not shown) for communicating with other entities in the network. Application server 114 also includes an interface mapping module 208 for transferring data between and carrying out any data format or protocol conversion required between the three interfaces. An application manager module 200 oversees and/or performs the various data processing tasks and software processes required for controlling and managing the subscriber text messaging services of the present invention. Application manager module 200 has access to subscriber data store 116 and is able to retrieve data from and write data to store 116.

Further, data being transceived between application server 114 and various other entities in the network will pass via one or more of interfaces 202, 204 and 206 including data format conversion by interface mapping module 208. The details of transfer via the various interfaces of application server 114 will not be described herein in detail for each data transfer, but will be clear to one skilled in the art.

Whilst application manager 200 within application server 114 will be responsible for performing the majority of the functions of the invention, reference is made hereinafter to the application server itself carrying out the various functions.

Figure 3:
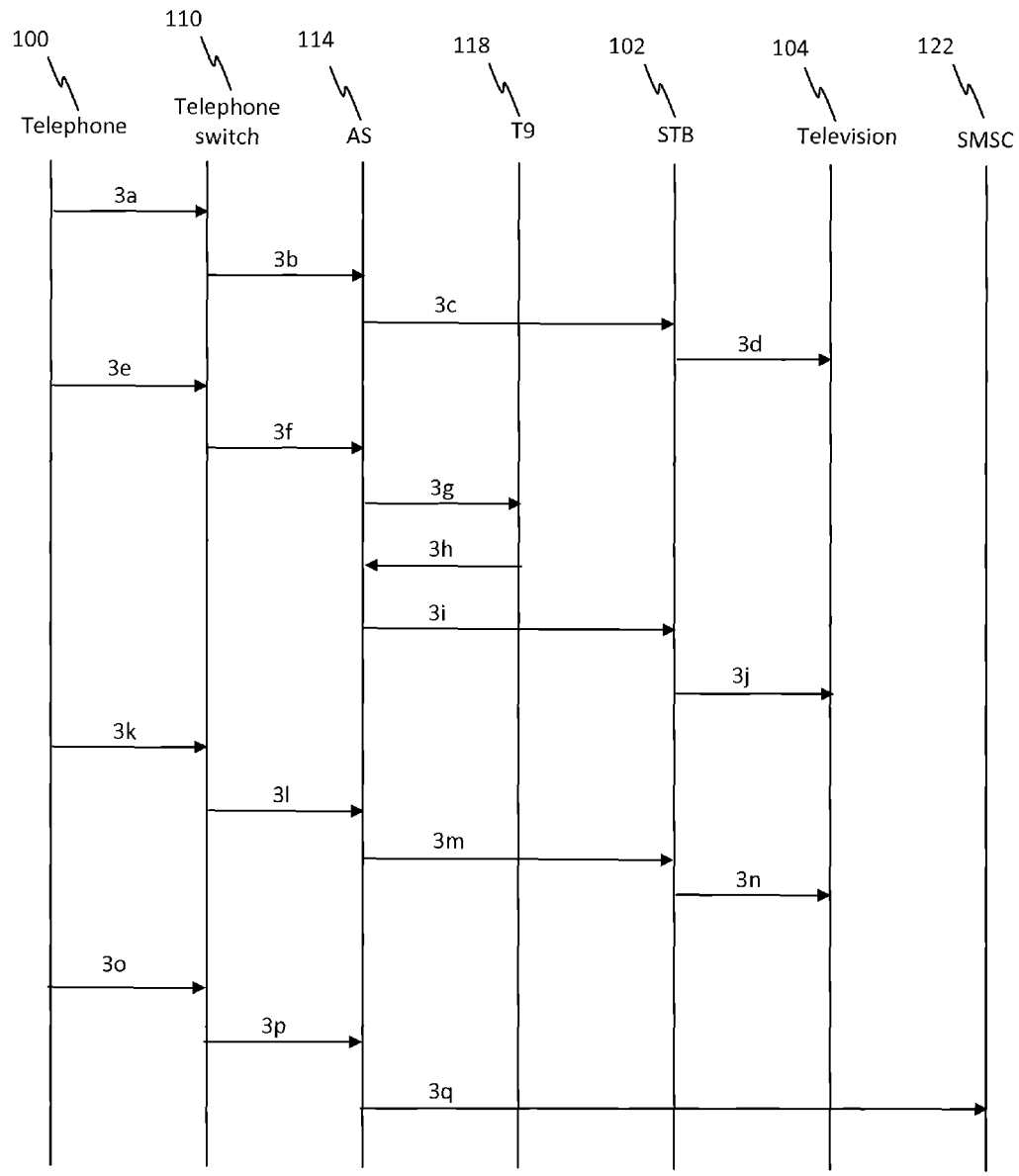
FIG. 3 is a data flow diagram according to embodiments of the present invention.

FIG. 3 is a flow diagram according to embodiments of the present invention. In the embodiment depicted in FIG. 3, a subscriber requests initiation of text messaging services by inputting a specific access code using the appropriate keys on their telephone 100, as shown in step 3a. The access code may for example include the digits/symbols '**123'.

An identifier for the subscriber equipment from which the text messaging service initiation request of step 3a originates is inserted into the request. Here, the service initiation request originates from the subscriber's telephone 100, so a subscriber equipment identifier for telephone 100 such as its associated telephone dialing number is inserted into the service initiation request.

Telephone switch 110 has been configured to recognize the access code received from telephone 100 and when such is received at telephone switch 110, telephone switch 110 recognizes that the code is not a standard telephone dialing number, but a code indicating that the request should be treated in a specific manner such that the request is forwarded to application server 114, as shown in step 3b. The service initiation request of step 3b includes the subscriber equipment identifier for the subscriber's telephone 100.

When application server 114 receives the service initiation request of step 3b, application manager 200 accesses subscriber data store 116 in order to determine whether the subscriber should be granted access to the text messaging services of the invention. Accessing store 116 involves searching for the subscriber equipment identifier contained in the service initiation request of step 3b.

If the search returns a zero result, i.e. the subscriber equipment identifier is not present in store 116, then access to the text messaging services of the invention is refused and no further action is taken.

If the search returns a positive result, i.e. it is determined that the subscriber equipment identifier is present in store 116, then access to the text messaging services of the invention is granted. In this case, store 116 also contains a further subscriber equipment identifier associated with a further piece of subscriber equipment of the subscriber, i.e. STB 102, which is stored in a database record associated with the subscriber. The further subscriber equipment identifier is then used to contact STB 102, as shown in step 3c.

STB 102 is contacted by application server 114 by transmittal of a further service initiation request to STB 102, as shown in step 3c.

STB 102 has been configured to recognize service initiation requests from application server 114 and act according to command data received from application server 114 in order to update the display output from television 104. The configuration of STB 102 will typically involve updating the application software running on STB 102, for example using a tool such as the MEDIAROOM software product provided by MICROSOFT. Configuration of STB 102 includes storing information relating to a network address at which STB 102 may contact application server 114.

When STB 102 receives the service initiation request of step 3c, it updates the visual output to television 102 accordingly, as shown in step 3d. The update of step 3d may for example involve opening up a window on the display screen on television 104 in which the subscriber is to create their text message, and any other relevant windows or menu options as may be required.

When the user sees the updated display screen of step 3d, the subscriber knows that initiation of the text messaging services has been completed and they may begin to create their text message using their telephone 100.

When the subscriber presses one or more keys on their telephone 100, key stroke data including one or more text characters is transmitted to application server 114 via telephone switch 110, as shown by steps 3e and 3f. Note that in preferred embodiments of the invention, key stroke data will be transmitted to application server 114 after every key is pressed by the subscriber, such that in response to each keystroke, the subscriber will see that latest text prediction(s); however, in alternative embodiments of the invention key stroke data may only be transmitted to application server 114 after multiple keys have been pressed.

The key stroke data is received at application server 114, which transmits the key stroke data on to text prediction entity 118, as shown by step 3g. Text prediction entity 118 performs a lookup in text prediction database 120 using the received text characters as input, which results in an output of one or more corresponding text predictions. The one or more output corresponding text predictions are transmitted back to application server 114 in the form of text prediction data, as shown in step 3h. Application server 114 then transmits the text prediction data on to STB 102 in step 3i which updates the output of television 104 accordingly. The subscriber is now able to see predicted text on television 104 for the text characters they entered using their telephone 100.

At this stage, the subscriber may decide to enter in more text characters for a word or words they wish to insert into the text message being created by pressing further appropriate keys on telephone 100. This will result in a similar process (not shown in FIG. 3) to steps 3e to 3j described above resulting in the output of television 104 being further updated. Further key stroke data is transmitted from telephone 100 to telephone switch 114, on to application server 114 and then to text prediction entity 118. Here, however, the lookup will be based on a more specific lookup in text prediction database 120 based on both the key stroke data received in step 3g and also the further key stroke data. This is likely to result in a more specific output from the text prediction entity 118 because more input text characters are likely to result in less potential text predictions being found during lookup in text prediction database 120. This will in turn lead to less text prediction options being displayed to the subscriber via television 104.

Note that the aggregation of key presses, including for example, backspace/delete logic, could be done either by application server 114 or text prediction entity 118; preferably, this would be done by application server 114, which allows text prediction entity 118 to be stateless. So, for example, if the subscriber typed "2345", then application server 114 would transmit "2" to text prediction entity 118 after the first key press; after the second key press, application server 114 would transmit "23" to text prediction entity 118; after the third key press, application server 114 would transmit "234" to text prediction entity 118; and after the fourth key press, application server 114 would transmit "2345" to text prediction entity 118. If the subscriber then did something to delete the final character (for example using the remote control or, using an extended press of a key such as the "*" key on telephone 100), then application server 114 would transmit "234" to the text prediction engine.

The text prediction data received from text prediction entity 118 includes one or more text segment predictions corresponding to the text characters entered by the subscriber. When a subscriber reviews the text segment predictions displayed on their television 104 and wants one of the segments to be inserted into the text message they are creating, they can provide a suitable input via their telephone 100 (for example using the '#' symbol or suchlike). This results in predicted text selection data being transmitted from telephone 100 to application server 114 via telephone switch 110, as shown by steps 3k and 3l. When application server 114 receives the predicted text selection data it forwards this on to STB 102 in step 3m, which updates the visual display on television 104 accordingly, as shown in step 3n. The subscriber can then see the text segment they selected inserted into the text message they are creating.

At this stage, the subscriber may decide to enter in more text characters for further words and select further text segments from text prediction data for insertion into the text message they are creating. This will result in similar processes as per steps 3e to 3n being carried out which are not shown in FIG. 3, but which will be clear to one skilled in the art.

When the subscriber has finished creating the text message, and wishes to send the text message to the desired recipient, the subscriber can provide a suitable input via their telephone 100 (for example using the '*' symbol or suchlike). This results in send created text message command data being transmitted from telephone 100 to application server 114 via telephone switch 110, as shown in steps 3o and 3p. In response to receipt of the send created text message command data of step 3p, application server 114 transmits created text message data to a suitable text message processing entity in the network, as shown by step 3q. The created text message data includes the text segments which are to form the body text of the text message, details of the intended recipient of the text message such as a telephone dialing number for the intended recipient, and possibly data identifying the subscriber who is sending the text message such as a telephone dialing number associated with the subscriber's telephone 100, an identifier associated with the subscriber's STB 102, or other username associated with the subscriber.

The text message processing entity may comprise an SMSC entity 122 located in mobile network 124 whose operation for delivering the created text message to its intended recipient will be clear to one skilled in the art.

In embodiments of the invention, a network-based address book in the form of a store of contacts for potential recipients of text messages can be maintained, for example in subscriber data store 116. When a subscriber chooses to send the text message they have created, data identifying potential recipients of the text message is retrieved from the network-based address book and displayed on the subscriber equipment, for example on the screen of their television. The subscriber can then review a list of potential recipients of the text message displayed on the television screen and select one or more recipients via appropriate input on their subscriber equipment, for example by pressing one or more keys on their telephone or their remote control. Data associated with the selected recipient(s) can then be forwarded by application server 114 to the short message service centre 122 which can arrange delivery of the text message accordingly.

Alternatively or in addition to use of the network-based address book, the subscriber may type in the destination number(s) of one or more recipient(s) of the text message, for example using their telephone, whereby the short message service centre 122 can be informed accordingly.

The key stroke data transmitted from telephone 100 will typically be transmitted in the form of DTMF audible signals (sometimes referred to as DTMF tones) created by telephone 100 in response to key-presses by the subscriber during creation of the text message. For example, a key-press on a first key on the keypad of telephone 100 may cause telephone 100 to generate a first DTMF audible signal to represent a first key stroke, and a key-press on a second key on the keypad of telephone 100 may cause telephone 100 to generate a second, different DTMF audible signal to represent a second key stroke.

DTMF keystroke representations can be constructed on telephone keypads and transmitted within a telephony network using known mechanisms which will be clear to one skilled in the art.

In the embodiments of the invention described above in relation to FIG. 3, a subscriber initiates text messaging services, inputs text characters, selects text segment predictions and instructs sending of the created text message to its intended recipient via key presses on telephone 100.

In other embodiments of the invention described below in relation to FIG. 4, the subscriber equipment also includes a remote control device 106 which interfaces with STB 102 and/or television 104 via a short-range air interface. The short-range air interface may be an infra-red or radio-frequency interface as known in the art. In such embodiments, a subscriber may initiate text messaging services, select text segments and instruct sending of the created text message to its intended recipient via key presses on remote control device 106.

Note that inputting of text characters via a remote control device is preferably not carried out in the present invention. The nature of remote control devices and their interfaces is such that they can be unreliable. For example, undesired outcomes may occur because the direction in which the remote control is pointing may change due to movement of the subscriber. This means that whilst a user may wish to enter a certain sequence of key presses, only one key press or an incorrect combination of key presses is detected by the set-top box or television, which can in turn lead to less relevant text predictions being displayed to the subscriber. Such undesired outcomes are even more common when a subscriber enters multiple key presses of the same key, because correct transmittal and detection of such sequences via an infra-red air interface is inherently prone to errors.

Figure 4:
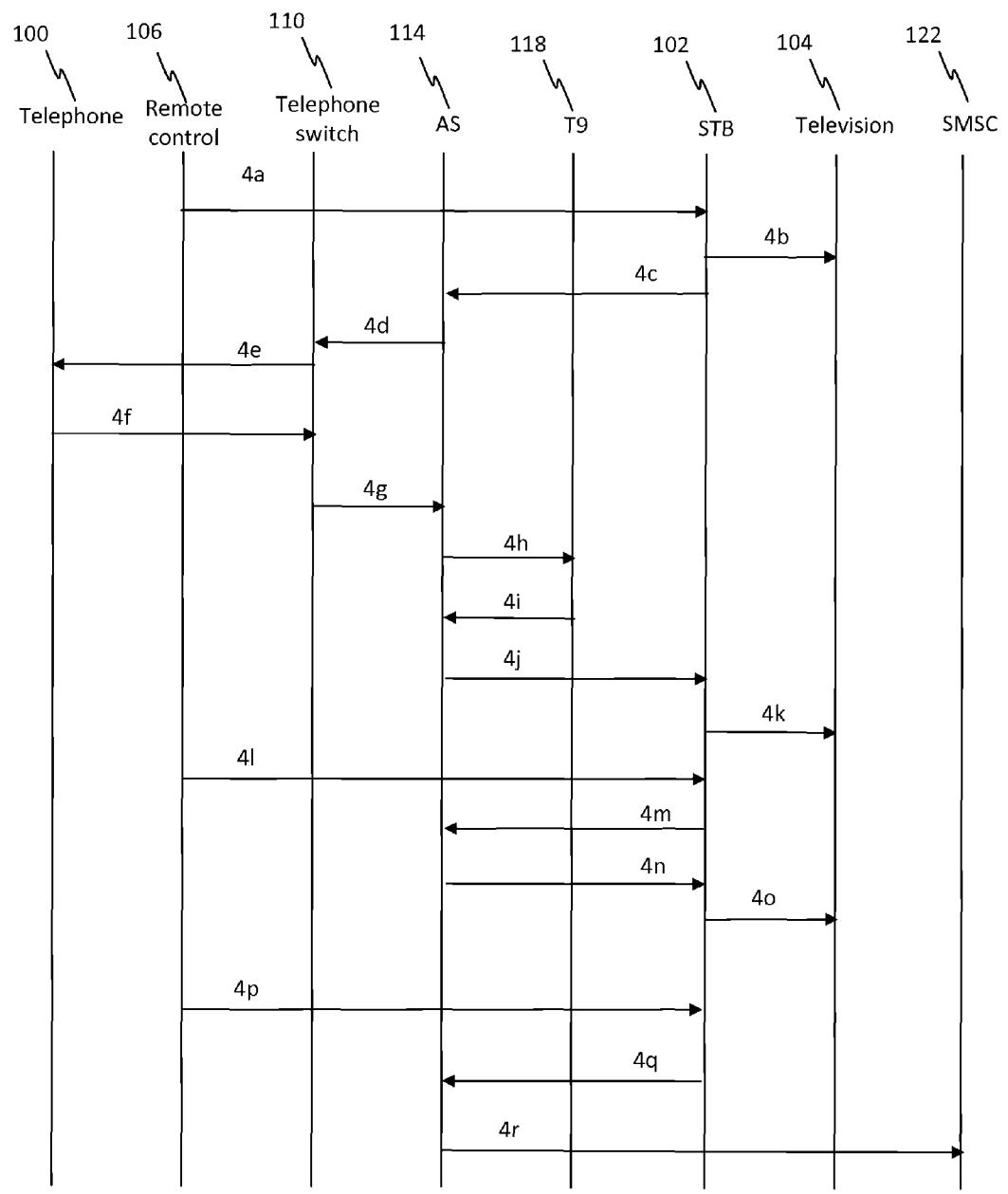
FIG. 4 is a data flow diagram according to embodiments of the present invention.

In the embodiments of the invention depicted in FIG. 4, a subscriber initiates text messaging services by one or more key presses on remote control device 106. In response, remote control device 106 generates an appropriate output signal for initiating text messaging services and transmits this across the short-range air interface for detection by STB 102, as shown in step 4a. This may correspond to a subscriber selecting an option to initiate text messaging services from an on-screen menu displayed on television 104. When STB 102 receives the initiate text messaging services signal from remote control device 106 in step 4a, it carries out two procedures.

The first procedure carried out by STB 102 is to update the output of television 104 to show that text messaging services are being initiated as shown in step 4b, for example by opening a text message creation window and displaying a suitable message to the subscriber on-screen.

The second procedure carried out by STB 102 is to transmit a service initiation request containing a subscriber equipment identifier associated with television 104, for example a network address for STB 102, to application server 114 as shown in step 4c.

When application server 114 receives the service initiation request of step 4c, application manager 200 accesses subscriber data store 116 in order to determine whether the subscriber should be granted access to the text messaging services of the invention. Accessing store 116 involves searching for the subscriber equipment identifier contained in the service initiation request of step 4c.

If the search returns a zero result, i.e. the subscriber equipment identifier associated with television 104 is not present in store 116, then access to the text messaging services of the invention is refused and no further action is taken.

If the search returns a positive result, i.e. it is determined that the subscriber equipment identifier associated with television 104 is present in store 116, then access to the text messaging services of the invention is granted. In this case, store 116 also contains a further subscriber equipment identifier associated with a further piece of subscriber equipment of the subscriber, i.e. telephone 100, which is stored in a database record associated with the subscriber. The further subscriber equipment identifier, e.g. the telephone dialing number of telephone 100, is then used to contact telephone 100, as shown in steps 4d and 4e.

Contacting telephone 100 in steps 4d and 4e will typically comprise application server 114 instructing telephone switch 110 to activate a distinctive ring service for telephone 100. Here, telephone 100 is identified by application server 114 and telephone switch 110 using the subscriber equipment identifier retrieved from subscriber data store 116. The distinctive ring service may cause telephone 100 to ring with a shorter than standard ring pattern (sometimes referred to as a 'ringsplash') which the subscriber will recognise as being in relation to text messaging services, rather than a standard incoming telephone call.

When the subscriber hears the distinctive ring on their telephone 100, the subscriber knows that initiation of the text messaging services has been completed and that they may begin to create their text message by taking telephone 100 off-hook and entering text characters using one or more key presses on the keys of telephone 100.

Entering text characters, obtaining text predictions and displaying text segment predictions corresponding to the entered text characters can be carried out in a similar manner to steps 3e to 3j of FIG. 3 which correspond respectively to steps 4f to 4k of FIG. 4.

When a subscriber reviews the one or more text segment predictions displayed in step 4k on their television 104 and wants one of the segments to be inserted into the text message they are creating, they can provide a suitable input using their subscriber equipment. In the embodiments of FIG. 4, however, instead of selecting a text segment prediction using their telephone 100 as in step 3k of FIG. 3, the subscriber uses remote control device 106 to select a text segment prediction. Remote control device 106 generates an appropriate control signal containing appropriate predicted text selection data and transmits such across the short-range air interface to STB 102 (or alternatively to STB 102 via television 104), as shown in step 4l.

When STB 102 receives the predicted text selection data it informs application server 114 of the predicted text selection accordingly as shown in step 4m. Application server 114 processes the predicted text selection data and instructs STB 102 to update the visual display on television 104 accordingly, as shown in steps 4n and 4o, such that the subscriber can see the text segment they selected inserted into the text message they are creating.

At this stage, the subscriber may decide to enter in more text characters for further words and select further text segments from text prediction data for insertion into the text message they are creating. This will result in similar processes as per steps 4f to 4n being carried out, which are not shown in FIG. 4, but which will be clear to one skilled in the art.

When the subscriber has finished creating the text message, and wishes to send the text message to the desired recipient, the subscriber can provide a suitable input via remote control device 106. This results in send created text message command data being transmitted from remote control device 106 to STB 102 and on to application server 114, as shown in steps 4p and 4q. In response to receipt of the send created text message command data of step 4q, application server transmits created text message data to a suitable text message processing entity in the network, as shown by step 4r. Similarly to the embodiments of FIG. 3, the created text message data includes the text segments which are to form the body text of the text message, details of the intended recipient of the text message, and possibly data identifying the subscriber who is sending the text message.

In embodiments of the invention, text prediction database 120 includes one or more subscriber-specific text dictionaries stored in addition to one or more non-subscriber-specific dictionaries for general use with multiple subscribers. In order that the subscriber-specific text dictionary for a subscriber may be identified and readily located within text prediction database 120, the subscriber-specific text dictionaries are stored within text prediction database 120 in association with one or subscriber equipment identifiers corresponding to the telephone 100 or television 104 of each subscriber.

A subscriber-specific text prediction dictionary will contain words or phrases which are particular to that subscriber, for example words or phrases manually added by the subscriber, which can be used as possible text predictions corresponding to text characters entered by the subscriber. Data indicating whether a subscriber has a subscriber-specific text prediction dictionary is stored in subscriber store 116. During searching of store 116 when text messaging services are being initiated, a check can be made as to whether the subscriber has a subscriber-specific text prediction dictionary.

A subscriber-specific text prediction dictionary may contain text prediction dictionaries in more than one language which may be selected by a subscriber and stored in a predefined subscriber profile. This may be useful where different members of a household having access to the telephone have different first language preferences. Which language dictionary is used when a household member wishes to send a text message in a particular language can be selected 'on the fly' by appropriate input via the input telephony device or television when the household member begins to create a text message. A default language dictionary can be employed for the most commonly used language in the household.

If it is determined that a subscriber does have a subscriber-specific text prediction dictionary, additional subscriber data, for example a subscriber equipment identifier for the subscriber's telephone 100 or television 104, can be added to key stroke data transmitted to text prediction entity 118 for lookup purposes (for example in step 3*e* or 4*f*). During lookup for text predictions corresponding to received text characters, text prediction entity 118 can identify the subscriber-specific text dictionary for a subscriber within text prediction database 120 on the basis of the received additional subscriber data and adjust its output text predictions accordingly.

Figure 5:
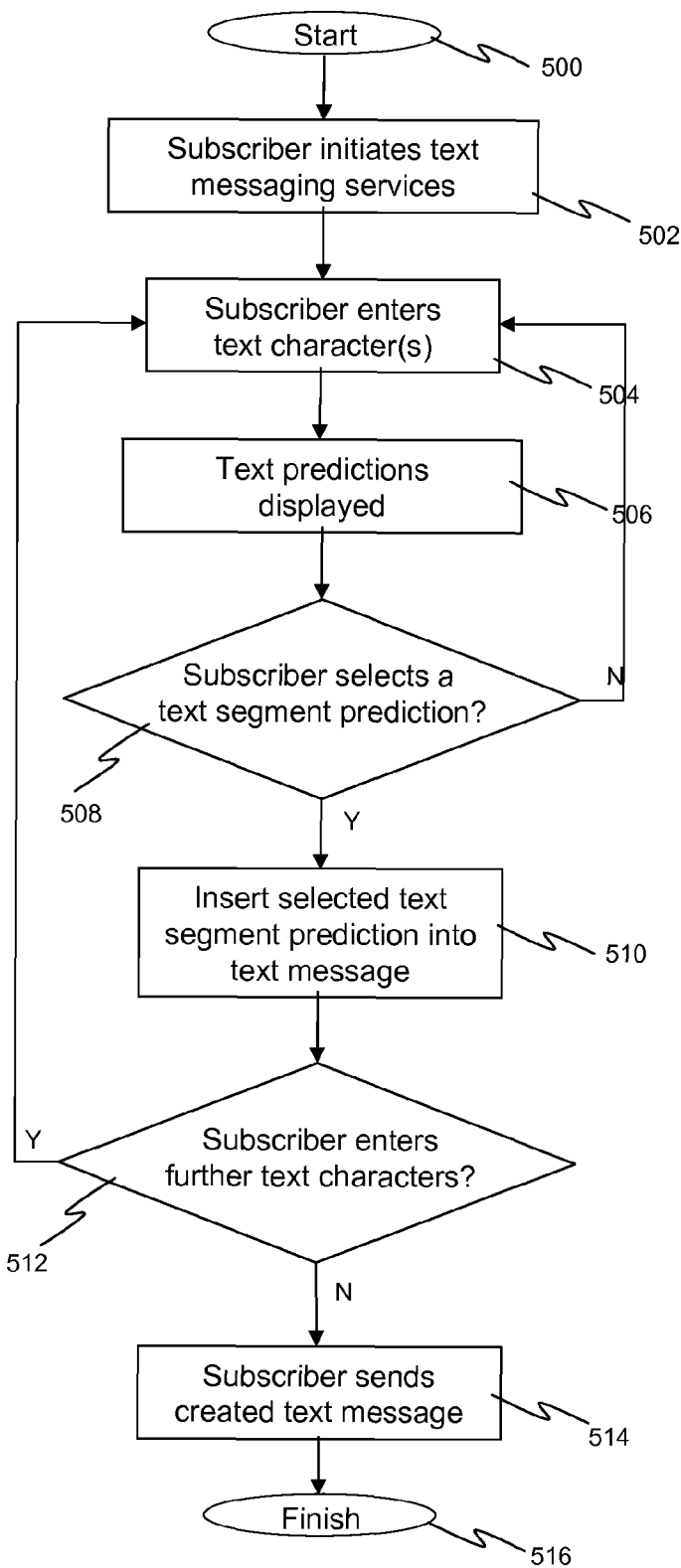
FIG. 5 is a flow chart according to embodiments of the present invention.

FIG. 5 is a flow chart according to embodiments of the present invention. The flow chart of FIG. 5 depicts the sequence of steps during provision of the text messaging services of the present invention for a subscriber.

The process begins 500 when a subscriber initiates text messaging services, as shown in step 502, by entering one or more key presses on telephone 100 or remote control device 106; this results in a series of steps which initiate text messaging services either by the process of steps 3*a* to 3*d* as described above in relation to FIG. 3, or by the process of steps 4*a* to 4*e* as described above in relation to FIG. 4, respectively.

Once text messaging services have been initiated, the subscriber is able to input text characters using key strokes on their telephone 100, as shown in step 504. Text predictions for the entered text characters are received from text prediction entity 118 and displayed, by the process of steps 3*e* to 3*j* or 4*f* to 4*k*, via television 104 for review by the subscriber, as shown by step 506.

If the subscriber chooses not to select one of the displayed text predictions in step 508, then the subscriber can enter more text characters and the process returns to step 504.

If the subscriber does choose to select one of the displayed text predictions in step 508, they enter suitable selection input either using telephone 100 or remote control device 106; this results in a series of steps being carried out (steps 3*k* to 3*n*, or steps 4*l* to 4*n* respectively) which insert the selected text segment into the text message displayed on the screen of television 104 as shown step 510.

The subscriber may then decide to enter in further text characters for further words to be inserted into the text message being created, in which case the process returns to step 504.

If the subscriber decides that the text message contains sufficient words such that no more entering of text characters is required, then the process moves on to step 514 where the subscriber sends the created text message to its intended recipient by suitable input using either telephone 100 or remote control device 106 (by the process of steps 3*o* to 3*q* or 4*o* to 4*q* respectively, after which the text messaging process ends in step 516.

The above embodiments are to be understood as illustrative examples of the invention. Further embodiments of the invention are envisaged.

The embodiments of FIG. 3 and FIG. 4 may be combined such that a subscriber may choose to initiate text messaging services, select text segments, and send a created text message using appropriate input to either telephone 100 or remote control 106, i.e. any of steps 3*a* to 3*d* or 4*a* to 4*e*, 3*k* to 3*n* or 4*l* to 4*n*, and 3*o* to 3*q* or 4*o* to 4*q*, may be used in any combination according to input received from the subscriber via telephone 100 and remote control 106.

Other embodiments of the invention allow subscribers to receive text messages and for such text messages to be displayed on their television. A subscriber could be alerted to receipt of a text message by a distinctive ring service directed to their telephone. The processes involved in receiving text messages according to the invention will be clear to one skilled in the art in view of the above description.

In embodiments of the invention described above, identifiers for the telephone and television equipment for a subscriber are stored together in association in a store. When a subscriber wishes to send a text message, an identifier for either the telephone or television equipment is received and an identifier for the other of the telephone or television equipment is retrieved from the store. In alternative embodiments of the invention, a user can manually identify both the telephony input and television equipment e.g. by initiating a text messaging application on their television equipment by making an appropriate menu selection using their remote control, which would then return, say, a unique 10-digit number (or other such identifier) on the screen of the television. The subscriber can then type the unique number into their telephone and such data can be transmitted to the application server in order to create a linkage between the two devices for providing text messaging services for the subscriber.

In alternative embodiments of the invention to those described above in relation to FIG. 4, instead of remote control device 106 transmitting signals across its short-range air interface for detection by STB 102, remote control device 106 transmits signals across its short-range air interface for detection by television 104, which in turn provides the information contained in the infra-red signals via its connection to STB 102.

In embodiments of the invention described above, text predictions are provided by a network-based text prediction entity, for example located in IP network 112. In alternative embodiments of the invention, text predictions may be provided by a text prediction application or engine running on the set-top box, i.e. the set-top box comprises the text prediction entity. In such embodiments, text prediction data is generated by the text prediction entity located within the set-top box, transmitted from the set-top box to be received by the television for display on-screen. Further, text prediction database 120 and/or one or more subscriber-specific text prediction dictionaries may be stored in memory associated with the set-top box instead of being located in the network and accessible by a network-based text prediction entity.

In the above description, when a text message is ready to be sent to its intended recipient, the necessary created text message data is transmitted to a short message service centre (SMSC) entity located in the telecommunications network which processes the created text message data accordingly to implement delivery of the text message to its intended recipient. In alternative embodiments of the invention, a Multimedia Messaging Service Centre (MMSC) or other such entity capable of overseeing the delivery of text messages may be employed instead of or in addition to the SMSC. In the case of the MMSC, a created text message could comprise a multimedia message including text and one or more still or video images selected by the subscriber using one or more of the telephone 100, remote control device 106, set-top box 102 and television 104. Further alternatively, the created text message may take the form of an e-mail message, an instant message, a social networking update message (e.g. a FACEBOOK or TWITTER status update), etc.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method for providing text messaging services to subscribers in a telecommunications network, each of said subscribers having subscriber equipment comprising a telephone and a television equipment, said method comprising the steps of:
   receiving first key stroke data corresponding to at least one text character associated with a text message, said first key stroke data having been input by said subscriber on a telephone;
   providing first text prediction data, obtained from lookup of said first key stroke data in a text prediction database, for display via said television equipment, said first text prediction data comprising predicted text for said at least one text character in said text message being created;
   maintaining a store of subscriber equipment identifiers for subscribers having access to said text messaging services in said network, said identifiers comprising for each subscriber, a telephony identifier associated with the telephone of the subscriber, and a visual display output device identifier associated with the television equipment of the subscriber;
   prior to receipt of said first key stroke data, receiving a first subscriber equipment identifier associated with one of said telephone and said television equipment of said subscriber;
   in response to receipt of said first subscriber equipment identifier, determining from said store a second subscriber identifier associated with the other of said telephone and said television equipment of said subscriber; and
   contacting said other of said telephone and said television equipment using said second subscriber identifier of said subscriber whereby to initiate text messaging services for said subscriber in said network.

2. A method according to claim 1, wherein said first text prediction data comprises a plurality of text segment predictions for said first key stroke data, and said method further comprises the steps of:
   receiving predicted text selection data from said telephone, said predicted text selection data corresponding to a subscriber selection of a text segment from said plurality of text segment predictions for insertion into said text message being created; and
   transmitting update data to said television equipment of said subscriber, whereby said subscriber may view an updated version of said text message being created comprising said selected text segment.

3. A method according to claim 1, further comprising the steps of:
   receiving second key stroke data corresponding to at least one further text character associated with said text message, said second key stroke data being input by said subscriber on said telephone; and
   providing second text prediction data, obtained from lookup of said first key stroke data and said second key stroke data in said text prediction database, for display via said television equipment, said second text prediction data comprising predicted text for said at least one text character and said least one further text character in said text message being created.

4. A method according to claim 1, wherein said television equipment comprises a set-top box connected to a television of said subscriber, wherein said text prediction data is provided by a network-based text prediction entity, said method further comprises the step of transmitting text prediction data to said set-top box, such that predicted text is displayed on said television.

5. A method according to claim 1, wherein said television equipment comprises a set-top box connected to a television of said subscriber, and wherein said text prediction data is provided by said set-top box.

6. A method according to claim 1, wherein said first subscriber equipment identifier is a subscriber equipment identifier associated with the telephone of said subscriber.

7. A method according to claim 6, wherein said first subscriber equipment identifier comprises a telephone dialing number associated with the telephone of said subscriber.

8. A method according to claim 1, wherein said first subscriber equipment identifier is a subscriber equipment identifier associated with said television equipment of said subscriber.

9. A method according to claim 8, wherein said first subscriber equipment identifier comprises a network address associated with a set-top box.

10. A method according to claim 8, wherein said contacting step comprises activating a distinctive ring service to the telephone of said subscriber.

11. A method according to claim 1, wherein said text prediction database comprises a subscriber-specific text prediction dictionary for said subscriber, and said method further comprises the step of:

identifying said subscriber-specific text prediction dictionary for said subscriber in said text prediction database on the basis of said received first subscriber equipment identifier, wherein said lookup of said first and/or second key stroke data for said subscriber in said database comprises lookup based on said subscriber-specific text prediction dictionary.

12. A method according to claim 11, wherein said subscriber-specific text prediction dictionary comprises one or more subscriber-specific text segment prediction entries added to said dictionary by or on behalf of said subscriber.

13. A method according to claim 1, wherein said subscriber telephone comprises an analogue telephone which is not adapted to display said text message.

14. A method according to claim 13, wherein said first and/or second key stroke data comprise dual-tone multi-frequency (DTMF) data created by said analogue telephone in response to key-presses by said subscriber on said analogue telephone during creation of said text message.

15. A method according to claim 1, further comprising the steps of:

receiving from said subscriber equipment send created text message command data; and in response to receipt of said send created text message command data, transmitting said send created text message data to a short message service centre (SMSC) entity located in said telecommunications network, such that said created text message is delivered to an intended recipient.

16. A method according to claim 15, further comprising the steps of:

displaying, via said television equipment, one or more contact identifiers associated with subscriber contacts, said contact identifiers having been retrieved from a network-based contact store associated with said subscriber in response to receipt of said send created text message data; and receiving, from said subscriber equipment, contact selection data whereby one or more intended recipients for said created text message are identified to said short message service centre entity.

17. A method according to claim 15, wherein said send created text message command data and/or said contact selection data are created by said telephone.

18. A method according to claim 15, wherein said television equipment further comprises a remote control device having a short-range air interface, and wherein send created text message command data is created by said remote control.

19. Apparatus adapted to perform the method of claim 1.

20. A computer program product comprising a non-transitory computer-readable medium having computer readable instructions recorded thereon, the computer readable instructions being operative, when performed by a processor, to cause the processor to perform the method of claim 1.

* * * * *